United States Patent
Saunders

[11] Patent Number: 6,029,935
[45] Date of Patent: Feb. 29, 2000

[54] METHOD FOR ADDING A GEOSTATIONARY COMPONENT TO A NON-GEOSTATIONARY SATELLITE NETWORK

[75] Inventor: Oliver W. Saunders, Los Angeles, Calif.

[73] Assignee: TRW Inc., Redondo Beach, Calif.

[21] Appl. No.: 09/012,111

[22] Filed: Jan. 22, 1998

[51] Int. Cl.⁷ .................................................. B64G 1/10
[52] U.S. Cl. .................................... 244/158 R; 455/13.2; 455/430
[58] Field of Search ........................ 244/158 R; 455/13.1, 455/12.1, 33.1, 54.1, 427–430; 701/13; 342/352–358

[56] References Cited

U.S. PATENT DOCUMENTS

| | | | |
|---|---|---|---|
| 3,497,807 | 2/1970 | Newton | 244/158 R |
| 4,109,202 | 8/1978 | Kudsia et al. | 455/13.1 |
| 4,691,882 | 9/1987 | Young | 455/13.1 |
| 4,985,706 | 1/1991 | Schukat | 455/13.1 |
| 5,119,225 | 6/1992 | Grant | 455/12.1 |
| 5,184,139 | 2/1993 | Hirako et al. | 342/354 |
| 5,415,368 | 5/1995 | Horstein et al. | 244/158 R |
| 5,678,175 | 10/1997 | Tuart et al. | 244/158 R |

*Primary Examiner*—Galen L. Barefoot
*Attorney, Agent, or Firm*—Michael S. Yatsko

[57] ABSTRACT

A method is disclosed for adding a geostationary component (201) to a low earth orbit satellite network. The method includes establishing a geostationary orbit for an administration satellite, providing an East-West communications link (218) between a low earth orbit satellite (202) at a polar location and the administration satellite and providing an RF link (216) between a ground based network control center (214) on the ground and the administration satellite. The method also includes the steps of transmitting administration information received by the administration satellite over the RF link (216) from the administration satellite to the low earth orbit satellite (202) over the East-West communications link (218).

20 Claims, 2 Drawing Sheets

METHOD FOR ADDING A GEOSTATIONARY COMPONENT TO A NON-GEOSTATIONARY SATELLITE NETWORK

BACKGROUND OF THE INVENTION

The present invention relates to inserting a geostationary satellite component into a non-geostationary satellite network. In particular, the invention relates to increasing the available user information bandwidth in a non-geostationary satellite network by redirecting administration information (for example, status and control information) through a geostationary satellite component.

Satellites are a common feature in modern communications networks and have long provided communications services on a global scale. A communications satellite often flies in a geostationary orbit (at approximately 42,245 km with an inclination and eccentricity of zero) so that the satellite always appears in the same spot in the sky. Satellites, however, may also be placed in other orbits, including Low Earth Orbits (LEO).

A LEO satellite typically orbits between 250 and 1000 km above the Earth. LEO satellites orbit the Earth independently of the Earth's own rotation and therefore do not maintain a constant location in the sky. Because the orbit of a LEO satellite periodically takes the LEO satellite over various locations on the Earth, the LEO satellite may be used to provide periodic communications services to those locations. A constellation of many LEO satellites may be used to provide nearly continuous coverage to virtually all areas of the Earth.

As an example, Teledesic LLC, located in Kirkland Wash., United States, has proposed a LEO constellation referred to as the Teledesic Network which flies 288 LEO satellites. The Teledesic Network incorporates 12 longitudinal orbital planes each with 24 LEO satellites. Each orbital plane is substantially perpendicular to the equator and separated from adjacent orbital planes by approximately 30 degrees. The altitudes of the satellites in each orbital plane are staggered so that the satellites pass below and above one another at the North and South poles, where each orbital plane converges. Although the discussion below is directed toward the Teledesic Network (and LEO satellite networks in general), it is noted that the present invention is applicable to any satellite network through which administration information, including status and control information, passes.

Two sets of optical links connect the satellites in the Teledesic Network. Sets of North-South links provide continuous connections between the satellites in individual orbital planes. Any first satellite in an orbital plane has connection to a second satellite ahead of its current position and a third satellite behind its current position. The North-South links provide a stable connection because the satellites in a particular orbit plane maintain substantially the same distance and angle between each other throughout their orbits.

Similarly, a set of East-West links provides a connection between the satellites in a first orbital plane and the satellites in a second orbital plane and a third orbital plane on either side of the first orbital plane (the adjacent orbital planes). Near the North and South Poles, however, the satellites typically do not maintain their East-West links due to dramatic increases in the relative rates of motion between adjacent satellites (slew) and because of the adverse pointing angles required to align receivers and transmitters. The satellites reestablish their East-West links after passing over the poles. Therefore, during the time periods in which the satellites pass over the Poles, little, if any, East-West communication occurs.

The North-South and East-West links (collectively "links") create a connective mesh that moves with the satellite network. The connective mesh routes data between individual satellites so that information injected into the satellite network from the ground may make its way to a satellite flying over the destination geographic region.

The links thus allow information to flow from virtually any point on the ground to any other point on the ground. However, because the satellites are constantly moving with respect the Earth, the connectivity dictating an optimal path from point to point on the surface of the Earth is constantly changing. As a result, a single, or small number of, ground cased Network Control Centers (NCCs) frequently transmit updated routing tables to the satellites. The satellites thus frequently update their routing tables so that they may provide an efficient information transport mechanism from source to destination as their positions continually change. Furthermore, the NCC is responsible for forwarding administration information through the satellite network to ground stations.

The administration information includes status and control information, for example, routing tables, cellular phone call-setup, and call-teardown. In general, administration information passes between ground stations and satellites on radio frequency (RF) links. The RF links may use a portion of the Ka frequency spectrum, for example, a 23–29 GHz uplink and a 18–19 GHz downlink. The RF links, of course, are also used to communicate user information from the ground to the satellite network and from the satellite network down to the ground.

Ordinarily, an NCC injects and receives status and control information into the satellite network by transmitting the status and control information to a satellite passing over the NCC. The status and control information is then forwarded through the network using the links and, when necessary, transmitted down to a destination ground station by a satellite flying over the destination ground station. A destination ground station may, for example, be a simple cellular phone or a complex communications center.

The bandwidth used to communicate the status and control information to and from the ground may grow very large as additional users take advantage of the satellite network. The status and control information may therefore significantly reduce the bandwidth available for user information and therefore the total capacity and revenue generating potential of the satellite network. In other words, the regular user information flow to ground based locations and around the satellite network is generally disrupted by the status and control information. In order to avoid disrupting traffic in major revenue producing regions, the NCC must be carefully located away from the revenue producing regions, potentially making NCC access relatively inconvenient for maintenance and upgrades, for example.

Furthermore, when a satellite in the network fails, it can no longer function as part of the connective mesh or handle status and control information. Therefore, some provision must be made to forward the status and control information into the network through an alternate NCC until such time as the initial NCC can again connect to the network. A failed satellite creates a hole in the connective mesh requiring further updates to the routing tables transmitted to the satellites.

A need exists in the industry for an improved method of handling control and status information for satellite networks.

BRIEF SUMMARY OF THE INVENTION

It is an object of the present invention to add a geostationary component to a non-geostationary satellite network.

It is another object of the present invention to add a geostationary component to a network or LEO satellites.

Yet another object of the present invention is to increase one amount of bandwidth available for user information in a satellite network.

Another object of the present invention is to provide a geostationary satellite backup for a satellite network.

The present invention provides a method for adding a geostationary component to a LEO satellite network. The method includes the steps of establishing a geostationary orbit for an administration satellite and providing an East-West communications link between a LEO satellite at a polar location (i.e., at the North or South Pole) and the administration satellite. The East-West communications link may, for example, be implemented as an optical inter-satellite link.

Once the geostationary orbit for the administration satellite is established, a network control center may transmit administration information from the ground to the administration satellite. The administration information may include, for example, status and control information including routing tables, call-setup, and call-teardown information. The administration satellite, after receiving the administration information, may then transmit the administration information to a LEO satellite over the East-West communications link.

At the polar locations, existing East-West links between LEO satellites in adjacent LEO planes are typically broken because of adverse pointing angles and high slew rates. Furthermore, there are typically few subscribers located in the polar regions. Therefore, the flow of user information is typically not adversely affected by using the East-West communications link between the administration satellite and a LEO satellite at a polar location. As a result, the administration information may be injected into the LEO satellite network with minimal disruption to revenue generating portions of the satellite network.

DETAILED DESCRIPTION OF THE INVENTION

Figure 1A:
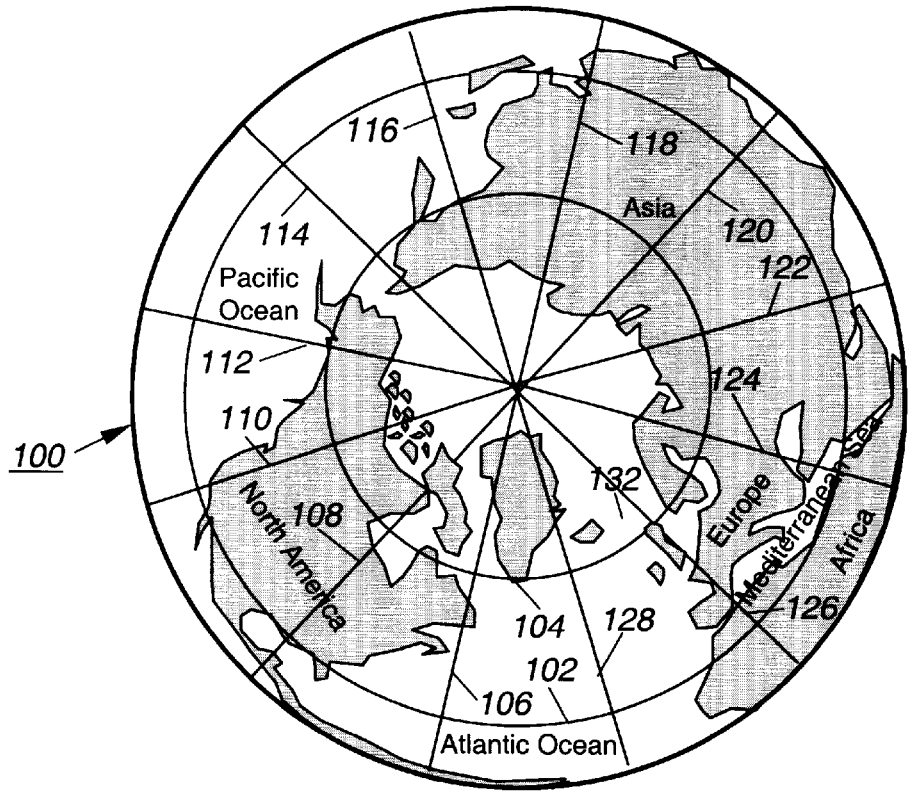
FIG. 1a illustrates a view of the planet Earth looking down on the North pole.

Turning now to FIG. 1a, that figure shows a view of the planet Earth 100 as seen looking down on the North Pole. Lines of latitude 102–104 and longitude 106–128 are also shown. The lines of longitude 106–128 are helpful in visualizing the Teledesic Network, in which 12 LEO orbital planes are defined, each containing 24 LEO satellites. Each of the orbital planes is arranged generally perpendicular to the equator (similar to the lines of longitude 106–128). The orbital planes meet over the North Pole, where there is little demand for satellite communications services.

Figure 1B:
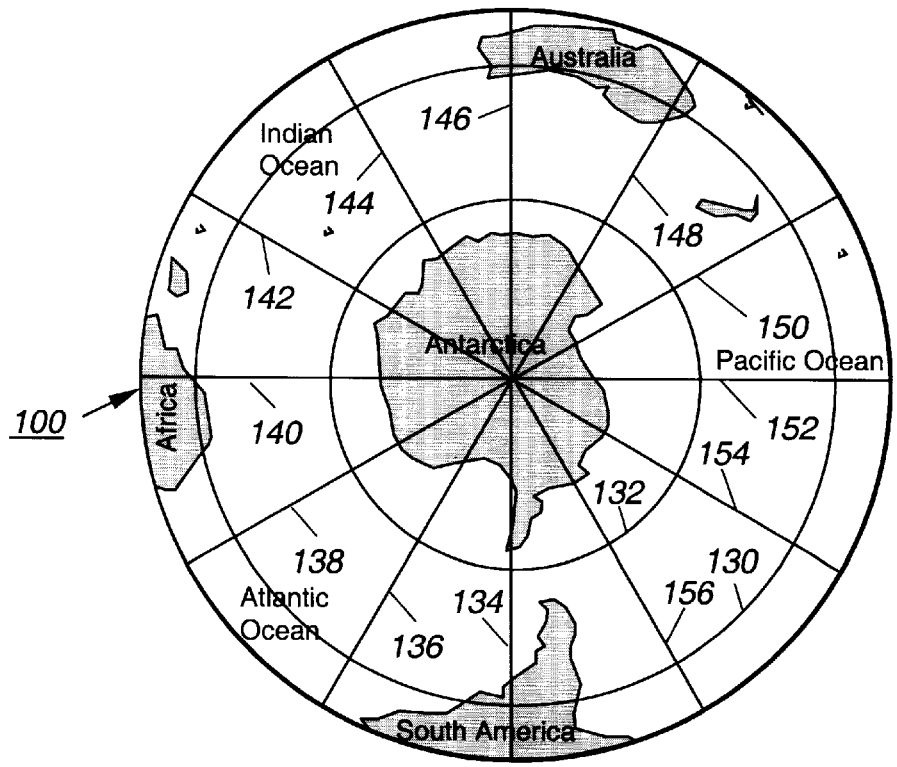
FIG. 1b shows a view of the planet Earth looking down on the South pole.

Similarly, FIG. 1b shows a view of the planet Earth 100 as seen looking down on the South Pole. Lines of latitude 130–132 and longitude 134–156 are also shown. Again, the lines of longitude 134–156 are helpful in visualizing the orbital planes of the Teledesic Network. The orbital planes converge over the South Pole (as well as the North Pole), where there is also little demand for satellite communications services.

As noted above, when passing over the poles, adverse slew rates and pointing angles prevent the satellites in a particular orbital plane from communicating over East-West links to satellites in adjacent orbital planes. Furthermore, there is typically a substantial lack of demand for satellite communications services in the polar regions. Therefore, the polar regions are attractive sites for injecting administration information.

Figure 2:
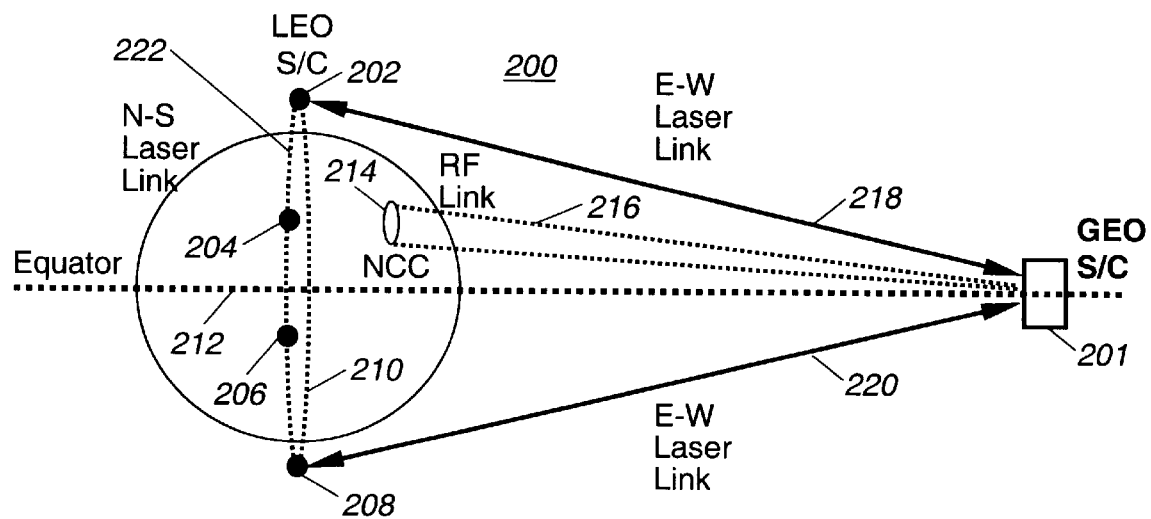
FIG. 2 shows a geostationary satellite in an orbit generally perpendicular to the orbit plane formed by LEO satellites.

Turning now to FIG. 2, that figure shows a diagram of a hybrid satellite network 200 including a geostationary component 201 (for example, a geostationary satellite) which communicates with LEO satellites 202–208. The LEO satellites 202–208 form an orbital plane 210 which is substantially perpendicular to the equator 212. FIG. 2 also shows a Network Communications Center (NCC) 214 communicating over an RF link 216 to the geostationary component 201. The geostationary component 201 may include a satellite, a space station, or, for example, a spacecraft in a temporary geostationary orbit. The geostationary component 201 communicates with the LEO satellites over East-West links 218 and 220. The LEO satellites 202–208 use East-West links to communicate with adjacent orbital planes (not shown) and North-South links (for example, North-South link 222) to communicate with LEO satellites in the same orbital plane.

The NCC 214 communicates with the geostationary component 201 using the RF link 216. The RF link 216 may be selected from a wide range of frequencies, including, for example a portion of the Ka frequency band. The East-West inks 218 and 220 will typically use the same type of East-West link employed among the LEO satellites to communicate with adjacent orbital planes. In the Teledesic Network, for example, the East-West links are optical (laser) inter-satellite links (ISLs).

Associated with the optics package used to generate the ISLs is an articulation range. The articulation range dictates the range of angles through which the optics package can point to transmit and receive and therefore communicate. The articulation range is designed such the LEO satellites 202–208 are able to maintain North-South TSLs with LEO satellites 202–208 in their orbital plane 210 and maintain East-West ISLs with LEO satellites in adjacent orbital planes. A small extension in the vertical component of the East-West articulation range, for example, to cover a range of −15 degrees to +15 degrees allows the LEO satellites passing over the poles to communicate with the geostationary component 201 in addition to LEO satellites in adjacent orbital planes.

The geostationary component 201, as shown in FIG. 2, is preferably located along the equator 212. In addition, the geostationary component 201 is preferably placed perpendicular to the LEO orbit plane 210 over the North and South Poles. A perpendicular alignment in conjunction with an East-West articulation range of −15 to +15 degrees provides an uninterrupted connection time of 20 minutes to an individual LEO satellite passing over the North or South Pole.

Figure 3:
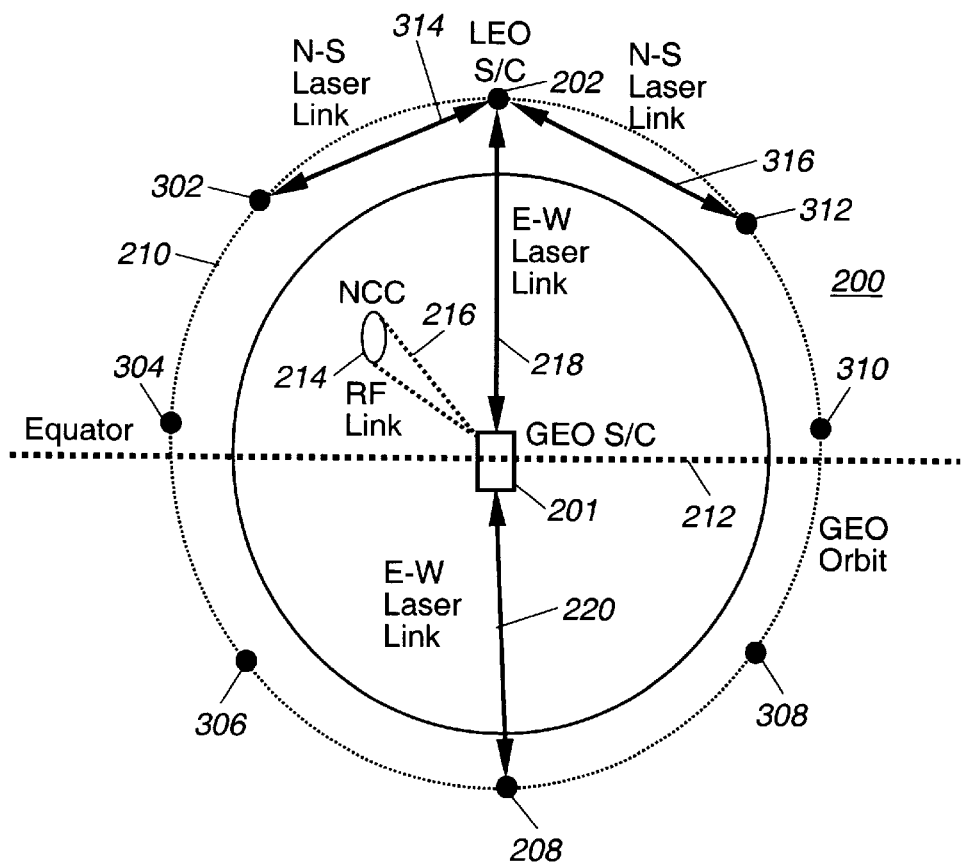
FIG. 3 shows another view of a geostationary satellite in communication with LEO satellites.

Another view of the hybrid satellite network 201 is shown in FIG. 3. FIG. 3 illustrates the geostationary component 201, LEO satellites 202 and 208, additional LEO satellites 302–312 and the LEO orbit plane 210. Two North-South ISLs 314 and 316 are illustrated between LEO satellites 302 and 202 and LEO satellites 202 and 312. The geostationary component 201 is illustrated in position along the equator 212 and in communication with the NCC 214 over the RF link 216. The geostationary component 201 communicates with the LEO satellite 202 over the East-West link 218 and with the LEO satellite 208 over the East-West link 220.

As noted above, the NCC 214 frequently needs to transmit administration information (including updated routing tables) to the LEO satellites 202–208, 302–312. The LEO satellites 202–208, 302–312 use the routing tables, for example, to efficiently route user information from source to destination as their positions over the Earth continually change. Note that the geostationary component 201 is not necessarily required for the LEO satellite network to function. Without the geostationary component 201 in place, the NCC transmits administration information directly to LEO satellites passing overhead on radio frequency (RF) links and this information can be subsequently routed, via links such as East-West links 218, 220 and North-South links 222 to any other satellites in the network. The RF links, however, are also used to communicate user information from the ground to the satellite network and from the satellite network down to the ground. A significant reduction in bandwidth available for user information may therefore result when the NCC 214 transmits administration information directly to the LEO satellites 202–208, 302–312.

With the geostationary component 201 in place, however, the NCC 214 may transmit the administration information directly to the geostationary component 201 using the RF link 216. The geostationary component 201 maw be added after the LEO satellite network has been established, or may be included as a standard feature of a hybrid satellite network or as a safeguard against a satellite failure in the LEO satellite network. The geostationary component 201 may then inject the administration information into the LEO satellite network, preferably at the North or South Pole. Because the East-West links between adjacent LEO satellite orbit planes are typically broken at the Poles, the East-West links 218 and 220 may be established without disrupting existing communications. The amount of revenue generating bandwidth provided by the LEO satellite network is thereby increased by the amount of bandwidth that would have been used to transmit administration information directly from the NCC 214 to the LEO satellite network.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications as incorporate those features which come within the spirit and scope of the invention.

What is claimed is:

1. A method for adding a geostationary component to a low earth orbit satellite network, the method comprising:
   establishing a geostationary orbit for a geostationary component;
   providing a first communications link between a satellite in a low earth orbit satellite network at a polar location and said geostationary component;
   providing a second communications link between a network control center and said geostationary component;
   transmitting administration information for said low earth orbit satellite network to said geostationary component over said second communications link then from said geostationary component to said low earth orbit satellite over said first communications link.

2. The method of claim 1, wherein said establishing step comprises establishing a geostationary orbit substantially perpendicular to an orbit plane defined by said low earth orbit satellite.

3. The method of claim 1, wherein said polar location is the North Pole.

4. The method of claim 1, wherein said polar location is the South Pole.

5. A hybrid satellite network comprising:
   a plurality of low earth orbit satellites defining at least one orbital plane, said plurality of low earth orbit satellites periodically passing over the North Pole and the South Pole;
   a geostationary component disposed in a geostationary orbit;
   a first communications link connecting said geostationary component to a network control center, said first communications link transmitting administration information for said at least one orbital plane; and
   a second communications link connecting said geostationary component and at least one of said low earth orbit satellites located over a Polar location, said second communications link transmitting said administration information.

6. The hybrid satellite network of claim 5, wherein said Polar location is the North Pole.

7. The hybrid satellite network of claim 5, wherein said Polar location is the South Pole.

8. The hybrid satellite network of claim 5, wherein said geostationary component comprises a communications satellite.

9. The hybrid satellite network of claim 5, wherein said administration information comprises routing table information for said at least one orbital plane.

10. The hybrid satellite network of claim 5, wherein said first communications link originates at a ground based network control center.

11. The hybrid satellite network of claim 10, wherein said second communications link is an East-West communications link.

12. The hybrid satellite network of claim 11, wherein said administration information is routing table information.

13. The method of claim 1, wherein said step of transmitting administration information comprises transmitting routing table information.

14. A method for distributing administration information in a satellite communication system, the method comprising:
   receiving administration information from a network control center at a geostationary satellite;
   establishing a communications link between said geostationary satellite and a low earth orbit satellite at approximately a polar location; and
   injecting said administration information from said geostationary satellite into a low earth orbit satellite constellation through said low earth orbit satellite, wherein said administration information is administration information for said low earth orbit satellite constellation.

15. The method of claim 14, wherein said step of transmitting administration information comprises transmitting routing table information.

16. The method of claim 14, wherein said establishing step comprises establishing an East-West link between said geostationary satellite and low earth orbit satellite at approximately a polar location.

17. The method of claim 14, wherein said establishing step comprises establishing an optical link between said geostationary satellite and low earth orbit satellite.

18. The method of claim 14, further comprising the step of establishing a geostationary orbit for said geostationary satellite substantially perpendicular to an orbit plane defined by said low earth orbit satellite constellation.

19. The method of claim 14, wherein said step of establishing a communications link between said geostationary satellite and a low earth orbit satellite at approximately a polar location further comprises establishing said communications link at the North Pole.

20. The method of claim 14, wherein said step of establishing a communications link between said geostationary satellite and a low earth orbit satellite at approximately a polar location further comprises establishing said communications link at the South Pole.

* * * * *